US009152431B2

(12) United States Patent
Watanabe

(10) Patent No.: US 9,152,431 B2
(45) Date of Patent: Oct. 6, 2015

(54) COMPUTER AND COMPUTER CONTROL METHOD

(75) Inventor: Masahisa Watanabe, Kanagawa (JP)

(73) Assignee: NEC INFRONTIA CORPORATION, Kawasaki (JP)

( * ) Notice: Subject to any disclaimer, the term of this patent is extended or adjusted under 35 U.S.C. 154(b) by 0 days.

(21) Appl. No.: 14/119,770

(22) PCT Filed: Sep. 22, 2011

(86) PCT No.: PCT/JP2011/071634
§ 371 (c)(1),
(2), (4) Date: Nov. 22, 2013

(87) PCT Pub. No.: WO2012/160717
PCT Pub. Date: Nov. 29, 2012

(65) Prior Publication Data
US 2014/0089615 A1 Mar. 27, 2014

(30) Foreign Application Priority Data
May 23, 2011 (JP) ................. 2011-114695

(51) Int. Cl.
*G06F 12/00* (2006.01)
*G06F 9/44* (2006.01)
*G06F 11/14* (2006.01)
*G06F 3/06* (2006.01)

(52) U.S. Cl.
CPC .............. *G06F 9/4406* (2013.01); *G06F 3/065* (2013.01); *G06F 3/0619* (2013.01); *G06F 3/0674* (2013.01); *G06F 11/1417* (2013.01); *G06F 11/1435* (2013.01); *G06F 11/1441* (2013.01)

(58) Field of Classification Search
CPC ............ G06F 11/1417; G06F 11/1438; G06F 17/177; G06F 9/4408; G06F 9/4406; G06F 11/1441; G06F 3/065; G06F 3/0674
USPC ................... 711/103, 154, E12.001; 713/1, 2
See application file for complete search history.

(56) References Cited

U.S. PATENT DOCUMENTS

| 6,862,681 | B2 * | 3/2005 | Cheston et al. ................... 713/2 |
| 7,194,659 | B2 * | 3/2007 | Buchanan et al. ............... 714/36 |
| 7,263,589 | B2 * | 8/2007 | Han et al. ...................... 711/163 |
| 8,037,291 | B2 * | 10/2011 | Peacock ............................ 713/2 |

(Continued)

FOREIGN PATENT DOCUMENTS

| CN | 1996246 A | 7/2007 |
| CN | 101593083 A | 12/2009 |

(Continued)

OTHER PUBLICATIONS

International Search Report for PCT Application No. PCT/JP2011/071634, mailed on Dec. 20, 2011.

(Continued)

*Primary Examiner* — Pierre-Michel Bataille
(74) *Attorney, Agent, or Firm* — Sughrue Mion, PLLC

(57) ABSTRACT

When a shutdown is detected, a master boot record (MBR) or a backup MBR are read. When the data of the MBR is not identical to the data of the backup MBR, the MBR is copied to the backup MBR. When the backup MBR cannot normally be read or is improper, the MBR is copied to the backup MBR. When the backup MBR cannot normally be read or is improper while the power of the computer is turned on, the MBR is copied to the backup MBR.

12 Claims, 10 Drawing Sheets

(56) References Cited

U.S. PATENT DOCUMENTS

| | | | |
|---|---|---|---|
| 2002/0059498 A1* | 5/2002 | Ng et al. | 711/112 |
| 2003/0014619 A1* | 1/2003 | Cheston et al. | 713/1 |
| 2009/0013167 A1* | 1/2009 | Wang | 713/2 |
| 2011/0202794 A1* | 8/2011 | Kim | 714/15 |
| 2012/0054475 A1* | 3/2012 | Lee | 713/1 |
| 2012/0084601 A1* | 4/2012 | Lee et al. | 714/15 |

FOREIGN PATENT DOCUMENTS

| | | |
|---|---|---|
| JP | 8-95868 A | 4/1996 |
| JP | 2001-188701 A | 7/2001 |
| JP | 2004-213365 A | 7/2004 |
| JP | 2005-215824 A | 8/2005 |
| JP | 2006-513490 A | 4/2006 |
| JP | 2006-527423 A | 11/2006 |
| JP | 2008-84168 A | 4/2008 |

OTHER PUBLICATIONS

Chinese Office Action for CN Application No. 201180071060.7 issued on Jun. 26, 2014 with English Translation.

* cited by examiner

FIG.10

| ADDRESS | | CONTENTS | | SIZE (BYTE) |
|---|---|---|---|---|
| Hex | Dec | | | |
| 0000 | 0 | BOOTSTRAP LOADER | | 446 |
| 01BE | 446 | FIRST PARTITION | PARTITION TABLE (16-BYTE EACH) | 64 |
| 01CE | 462 | SECOND PARTITION | | |
| 01DE | 478 | THIRD PARTITION | | |
| 01EE | 494 | FOURTH PARTITION | | |
| 01FE | 510 | 55h | BOOT SIGNATURE; 0xAA55 | 2 |
| 01FF | 511 | AAH | | |
| MBR SIZE | | | | 512 |

COMPUTER AND COMPUTER CONTROL METHOD

This application is National Stage Entry of PCT/JP2011/071634 filed Sep. 22, 2011, which claims priority from Japanese Patent Application 2011-114695 filed May 23, 2011 (Japanese Patent No. 5077726, Patent date: Sep. 7, 2012), the contents of all of which are incorporated herein by reference, in their entirety.

TECHNICAL FIELD

The present invention relates to a computer and a method for controlling a computer and, in particular, to a computer that copies a Master Boot Record (hereinafter, referred to as MBR) to a back up MBR or copies the back up MBR to the MBR, and a method for backing up and restoring the MBR on the computer.

BACKGROUND ART

The first sector on a disk drive used on a personal computer/advanced technology (PC/AT) compatible machine is referred to as MBR. The MBR stores a bootstrap loader, a partition table, and a boot signature.

A basic Input Output System (hereinafter, referred to as BIOS) in the PC/AT compatible machine searches a basic region in which a boot flag is set from the partition table and loads the boot loader recorded in the basic region to a memory using the bootstrap loader in order to boot the personal computer (PC). If the MBR is corrupted, the computer cannot boot.

There are more than a few systems that operate 24 hours×365 days among PC based point-of-sale systems (hereinafter, referred to as POS system). Some commercially available hard disks are sold and used without expecting such long continuous operations. Thus, even a hard disk manufacturer is sometimes not able to identify the cause of a trouble.

Corruption of the partition table in the MBR can cause not only the failure of boot of the PC but also the loss of entire data. As for the troubles due to corruption of the MBR on a silicon disk, the causes of the troubles are not necessarily clarified because the market is currently in the growth stage and the know-how is not sufficiently accumulated.

As the techniques relating to the present invention, Patent Literature 1 describes an invention about a method for determining abnormality in backup data and a method for handling an abnormality in an abnormal case. The data for control and the data for check are verified to determine which data is abnormal in order to restore the data with abnormality. Patent Literature 2 describes an invention about a protected, hidden, emergency boot directory. A backup operating system (OS) of a primary OS is created to load the backup OS in the event of a failure of the primary OS to boot or run. Further, Patent Literature 3 describes an invention about a method for restoring a computer OS. An OS boot program file is checked every time the computer boots in order to restore the corrupted part. Then, the system also checks the hard disk boot information and the like in order to restore the corrupted part. Patent Literature 3 also describes that the information in the boot sector is backed up during the initial backup.

CITATION LIST

Patent Literature

{PTL 1} JP-A-08-095868 (for example, Paragraph [0026])
{PTL 2} JP-W-2006-513490 (for example, Paragraph [0011])
{PTL 3} JP-W-2006-527423 (for example, Paragraphs [0014], [0029], [0030], and

SUMMARY OF INVENTION

Technical Problem

Conventionally, there is not a way to automatically restore an MBR. Thus, even in a high-capacity hard disk, the corruption of only a sector in the first MBR prevents the PC from booting, so that it is necessary to use another system to restore the PC with dedicated software or the like in order to restore the data.

An exemplary objective of the present invention is to resolve the malfunction on the boot of a personal computer (PC or PC/AT compatible machine) caused by corruption of the master boot record (MBR) by automatically backing up and automatically restoring the MBR.

Solution to Problem

A method according to a first exemplary aspect of the present invention is a method for controlling a computer comprising a CPU, and a storage unit, the storage unit storing a master boot record (MBR), a backup MBR to which the MBR is copied, and an OS, the method comprising:
reading, by the CPU, the MBR and the backup MBR from the storage unit using the OS when detecting a shutdown; and
performing, by the CPU, any one of following processes (1), (2), and (3):
(1) copying the MBR to the backup MBR when the MBR and the backup MBR are capable of normally being read and data of the MBR is not identical to data of the backup MBR;
(2) copying the MBR to the backup MBR when the MBR is capable of normally being read and the backup MBR is not capable of normally being read or is improper; and
(3) copying the backup MBR to the MBR when the backup MBR is capable of normally being read and the MBR is not capable of normally being read or is improper.

A method according to a second exemplary aspect of the present invention is a method for controlling a computer comprising storage unit and a memory storing a basic input output system (BIOS), the storage unit storing a master boot record (MBR), and a backup MBR to which the MBR is copied,
the method comprising:
reading, by the BIOS, the MBR and the backup MBR from the storage unit when a power of the computer is turned on;
copying the backup MBR to the MBR when the MBR and the backup MBR are capable of normally being read and data of the MBR is not identical to data of the backup MBR, and then booting the computer using the backup MBR as a MBR for starting up;
copying the MBR to the backup MBR when the MBR is capable of normally being read and the backup MBR is not capable of normally being read or is improper, and then booting the computer using the MBR as a MBR for starting up; and copying the backup MBR to the MBR when the backup MBR is capable of normally being read and the MBR is not capable of normally being read or is improper and then booting the computer using the backup MBR as a MBR for starting up.

A computer according to a third exemplary aspect of the present invention is a computer comprising:

a storage unit storing a master boot record (MBR), a backup MBR to which the MBR is copied, and an OS; and a CPU reading the MBR and the backup MBR from the storage unit using the OS when detecting a shutdown, and performing any one of following processes (1), (2), and (3):

(1) copying the MBR to the backup MBR when the MBR and the backup MBR are capable of normally being read and data of the MBR is not identical to data of the backup MBR;

(2) copying the MBR to the backup MBR when the MBR is capable of normally being read and the backup MBR is not capable of normally being read or is improper; and (3) copying the backup MBR to the MBR when the backup MBR is capable of normally being read and the MBR is not capable of normally being read or is improper.

A computer according to a fourth exemplary aspect of the present invention is a computer comprising:

a storage unit storing a master boot record (MBR), and a backup MBR to which the MBR is copied; and a memory storing a basic input output system (BIOS)

the BIOS performing:

reading the MBR and the backup MBR from the storage unit when a power of the computer is turned on;

copying the backup MBR to the MBR when the MBR and the backup MBR are capable of normally being read and data of the MBR is not identical to data of the backup MBR, and then starting up the backup MBR as a MBR for starting up;

copying the MBR to the backup MBR when the MBR is capable of normally being read and the backup MBR is not capable of normally being read or is improper, and then starting up the MBR as a MBR for starting up; and copying the backup MBR to the MBR when the backup MBR is capable of normally being read and the MBR is not capable of normally being read or is improper, and then starting up the backup MBR as a MBR for starting up.

A computer readable information storage medium according to a fifth exemplary aspect of the present invention is a computer readable information storage medium that stores a program causing a computer including a storage unit storing a master boot record (MBR), a backup MBR to which the MBR is copied, and an OS to read the MBR and the backup MBR when a shutdown is detected and to perform any one of following processes (1), (2), and (3):

(1) copying the MBR to the backup MBR when the MBR and the backup MBR are capable of normally being read and data of the MBR is not identical to data of the backup MBR;

(2) copying the MBR to the backup MBR when the MBR is capable of normally being read and the backup MBR is not capable of normally being read or is improper; and (3) copying the backup MBR to the MBR when the backup MBR is capable of normally being read and the MBR is not capable of normally being read or is improper.

A computer readable information storage medium according to a sixth exemplary aspect of the present invention is a computer readable information storage medium that stores a program causing a computer including a storage unit storing a master boot record (MBR), and a backup MBR to which the MBR is copied, and a memory storing a BIOS to read the MBR and the backup MBR when a power is turned on and to perform any one of following processes (1), and (2):

(1) copying the MBR to the backup MBR when the MBR and the backup MBR are capable of normally being read and data of the MBR is not identical to data of the backup MBR; and (2) copying the MBR to the backup MBR when the MBR is capable of normally being read and the backup MBR is not capable of normally being read or is improper.

ADVANTAGES EFFECTS OF THE INVENTION

According to the present invention, backed up sector data and the MBR are verified, and the sector data and the MBR can automatically be restored during the OS shutdown. A BIOS program verifies the MBR and the backed up sector data when the power is turned on. When not being able to normally be read or being improper, the MBR is automatically restored in order to start the OS.

BRIEF DESCRIPTION OF DRAWINGS

{FIG. 9} A figure illustrates a sequence in which the sector data of the backup MBR (LBA=15) is started as the MBR when the MBR has been corrupted while the power is turned on.

{FIG. 10} A figure illustrates an exemplary configuration of an MBR.

DESCRIPTION OF EMBODIMENTS

Hereinafter, an exemplary embodiment according to the present invention will be described using the drawings.

Figure 1:
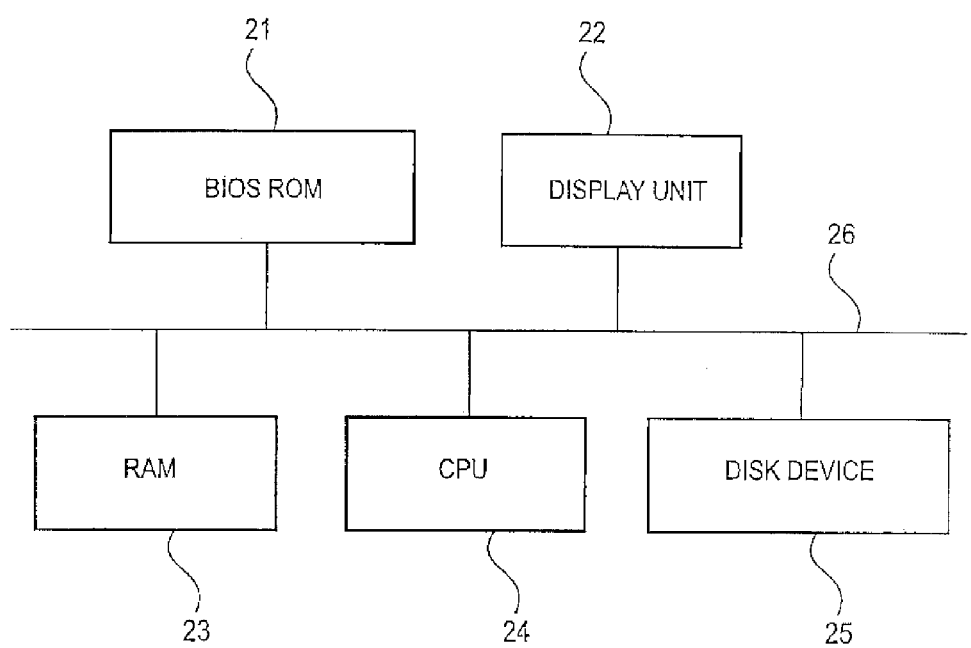
{FIG. 1} A figure illustrates an exemplary configuration of a computer of an embodiment of the present invention.

FIG. 1 illustrates an exemplary configuration of a computer of an embodiment of the present invention. The computer is a general PC/AT compatible machine. The computer in the present embodiment includes a BIOS ROM 21 working as a memory that stores a BIOS program, a display unit 22 that is a liquid crystal display or the like, a RAM 23 working as a memory, a CPU 24, a disk device (working as a storage unit) 25 that is a hard disk or the like, and a bus 26 that connects the components to each other. The BIOS program is stored in the BIOS ROM 21. A service program is stored in the disk device 25. In that case, the service program is a program for improving the functions or operability of the OS, the applications, and the like.

Executing the BIOS program and the service program using the CPU 24 can implement the backup and restoration operation of the MBR. The information necessary for the process for the backup and restoration operations of the MBR is stored in the RAM 23.

Figure 2:
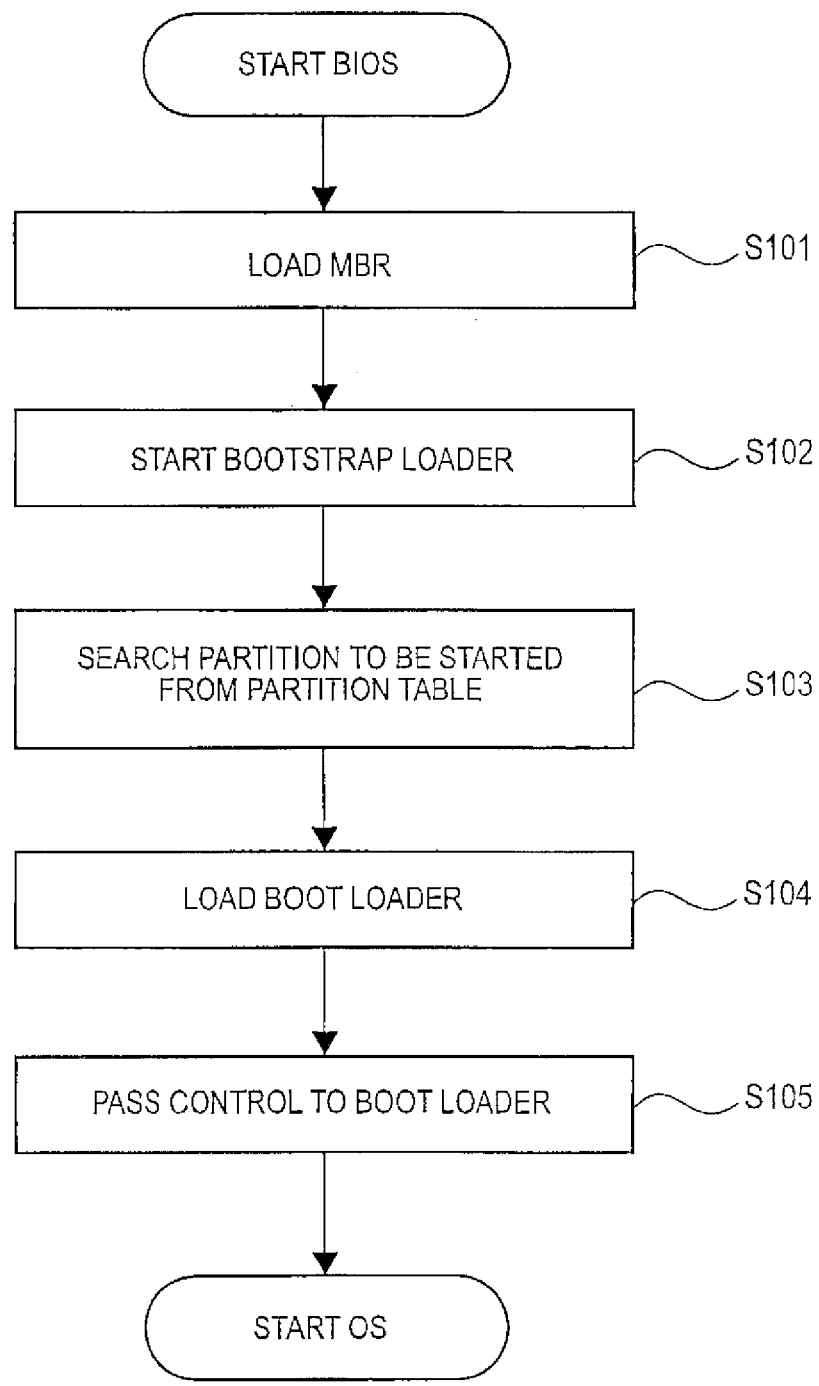
{FIG. 2} A figure illustrates a flowchart for describing a start-up process flow from a BIOS to an OS at the boot of a PC that is a general PC/AT compatible machine.

FIG. 2 illustrates a flowchart for describing a start-up process flow from the BIOS to the OS at the boot of a general PC. FIG. 10 illustrates an exemplary configuration of the MBR.

As illustrated in FIG. 2, the CPU 24 starts the BIOS stored in the BIOS ROM 21 to initially load the MBR (step S101). Sequentially, the CPU 24 starts a bootstrap loader (step S102) to search a partition to be started in a partition table (step S103). The CPU 24 further loads a boot loader (step S104) to pass the control to the boot loader (step S105) in order to start the OS.

Figure 3:
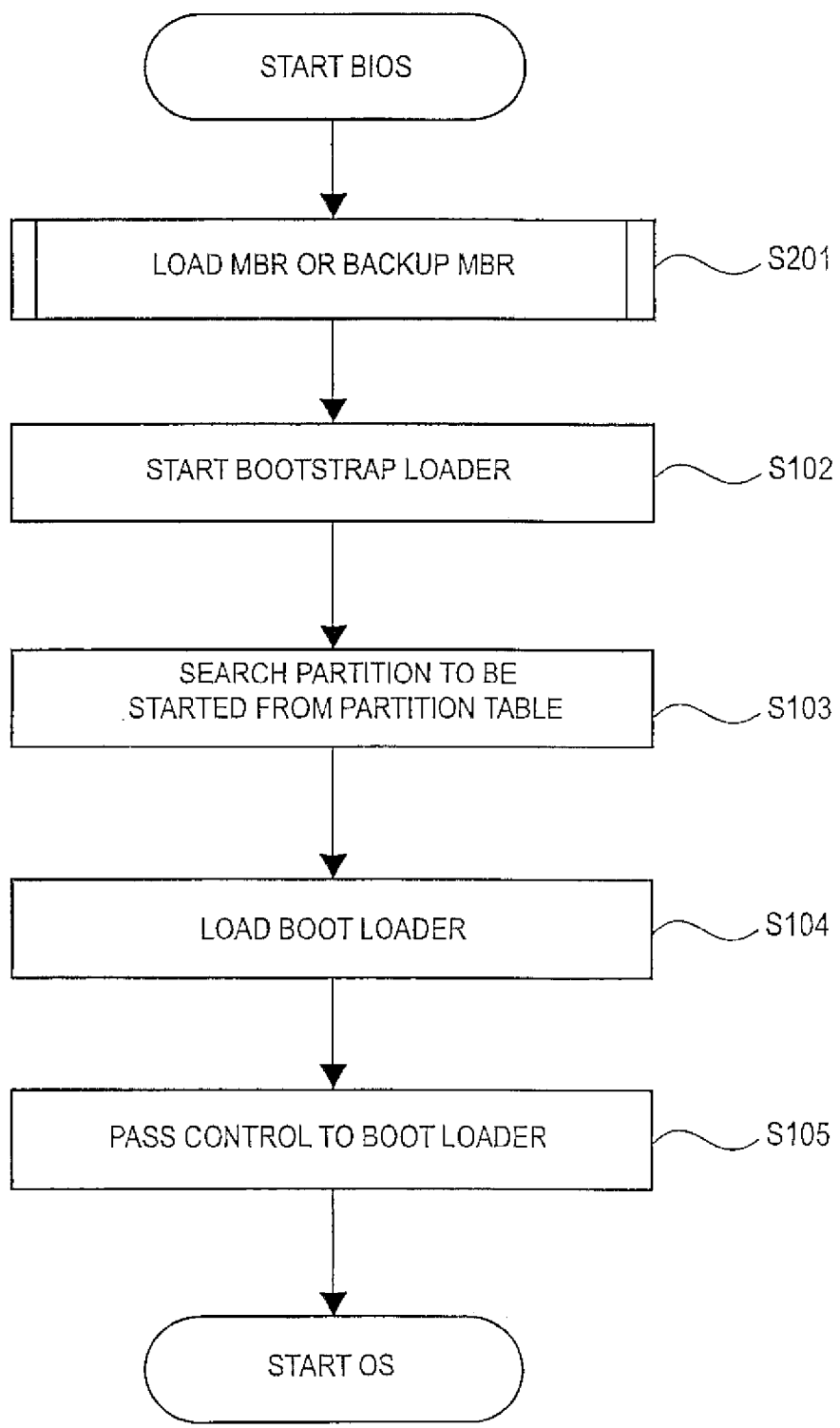
{FIG. 3} A figure illustrates a flowchart for describing a start-up process flow from a BIOS to an OS at the boot of the PC that is a computer according to the embodiment of the present invention.
Figure 4:
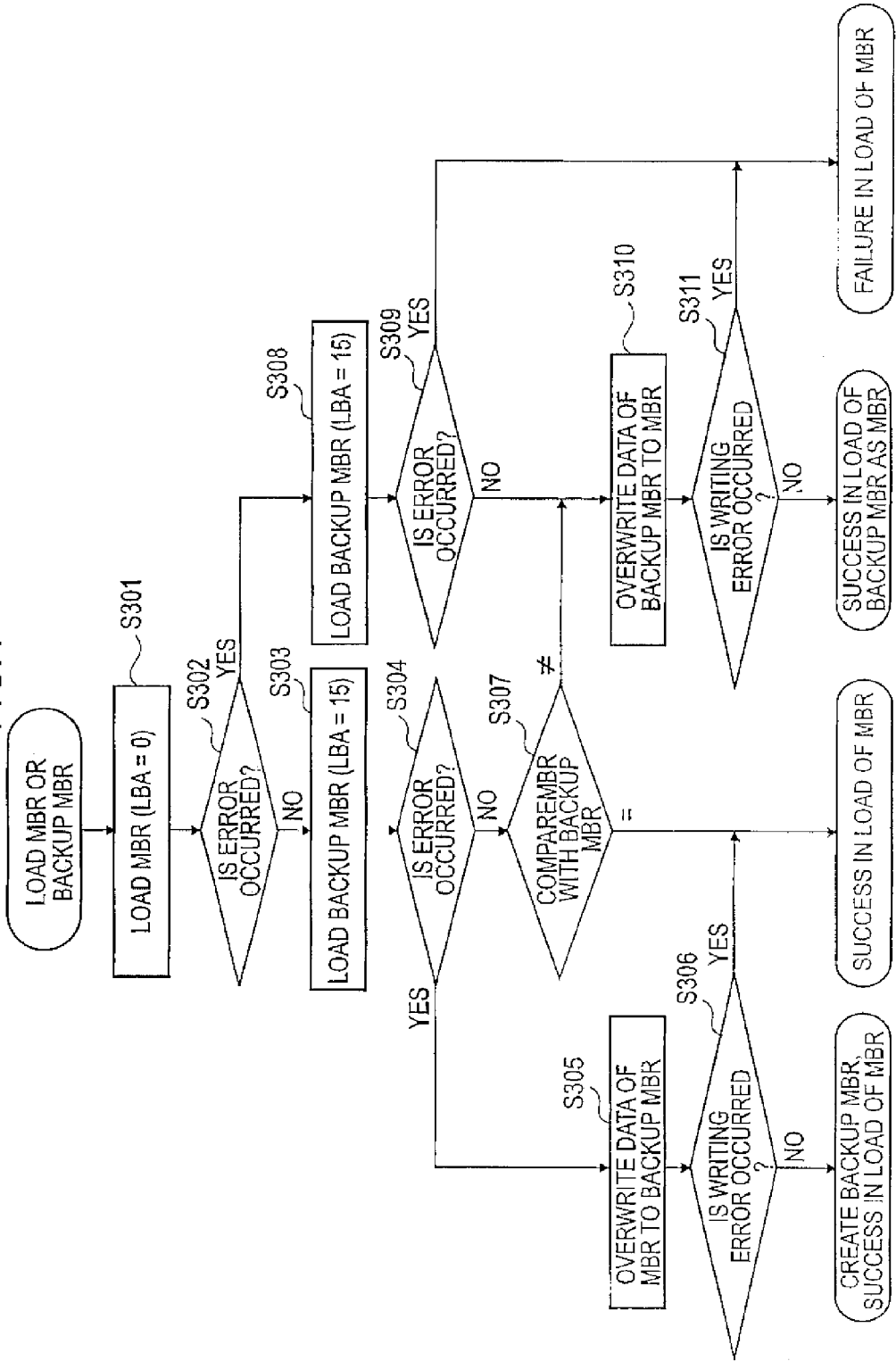
{FIG. 4} A figure illustrates a flowchart for describing step S201 in FIG. 3 in detail.

FIG. 3 illustrates a flowchart for describing a start-up process flow from the BIOS to the OS at the boot of the PC that is a computer according to the embodiment of the present invention. FIG. 3 illustrates a flow in which step S101 in FIG. 2 is replaced with step 201 so that the OS is started from a normal MBR or backup MBR. FIG. 4 illustrates a flowchart for describing step S201 in FIG. 3 in the BIOS in detail.

The Logical Block Address (hereinafter, referred to as LBA) of the backup MBR is assumed to be "15" in the present embodiment.

As illustrated in FIG. 4, the CPU 24 initially starts the BIOS stored in the BIOS ROM 21 to load the LBA 0 of the MBR (MBR (LBA=0)) (step S301). Sequentially, in the "Is error occurred?" determination of step S302, it is determined whether a read error of the disk occurs and whether the MBR is improper. Hardware malfunction of the disk, or data malfunction of the MBR can be cited as a cause of the read error. It is determined whether the MBR is improper from, for example, (1) whether the entire MBR is filled with 0xffff or 0x0000, (2) whether the last WORD data referred to as a boot signature is AA55h, (3) whether the partition information in the partition table does not overlap, or (4) whether the total size in the partition table does not exceed the disk capacity.

When the read error of the disk does not occur and the MBR is not improper (No in step S302), the LBA 15 of the backup MBR (backup MBR (LBA=15)) is loaded (step S303). Sequentially, in the "is error occurred?" determination of step S304, it is determined about the backup MBR whether a read error of the disk occurs, whether the MBR is improper, and whether the MBR has not been backed up.

When it is determined that a read error of the disk occurs, that the MBR is improper, or that the MBR has not been backed up (Yes in step S304), the data of the MBR is overwritten (copied) to the backup MBR (step S305). It is determined in step S306 whether a writing (write) error has occurred. When a writing error has not occurred (No in step S306), the backup MBR is created and then the load of the MBR is completed.

When it is determined that a read error of the disk does not occur, that the MBR is not improper, and that the MBR has been backed up (No in step S304), the MBR is compared to the backup MBR in step S307. When the MBR is identical to the backup MBR, the load of the MBR is completed. On the other hand, when the MBR is not identical to the backup MBR, the data of the backup MBR is overwritten (copied) to the MBR (step S310).

When a read error of the disk occurs (the disk is not normally read) or the MBR is improper in step S302 (Yes in step S302), the LBA 15 of the backup MBR is loaded (step S308). Sequentially, in the "is error occurred?" determination of step S309, it is determined about the backup MBR whether a read error of the disk occurs, whether the MBR is improper, and whether the MBR has not been backed up.

When it is determined that a read error of the disk does not occur, that the MBR is not improper, and that the MBR has been backed up (No in step S309), the data of the backup MBR is overwritten (copied) to the MBR (step S310). It is determined in step S311 whether a writing (write) error has occurred. When a writing error has not occurred (No in step S311), the backup MBR is loaded as the MBR.

When it is determined in step S309 that a read error of the disk occurs, that the MBR is improper, or that the MBR has not been backed up (Yes in step S309), the MBR cannot be loaded. Similarly, when a writing error has occurred in step S311 (Yes in step S311), the MBR cannot be loaded.

Figure 5:
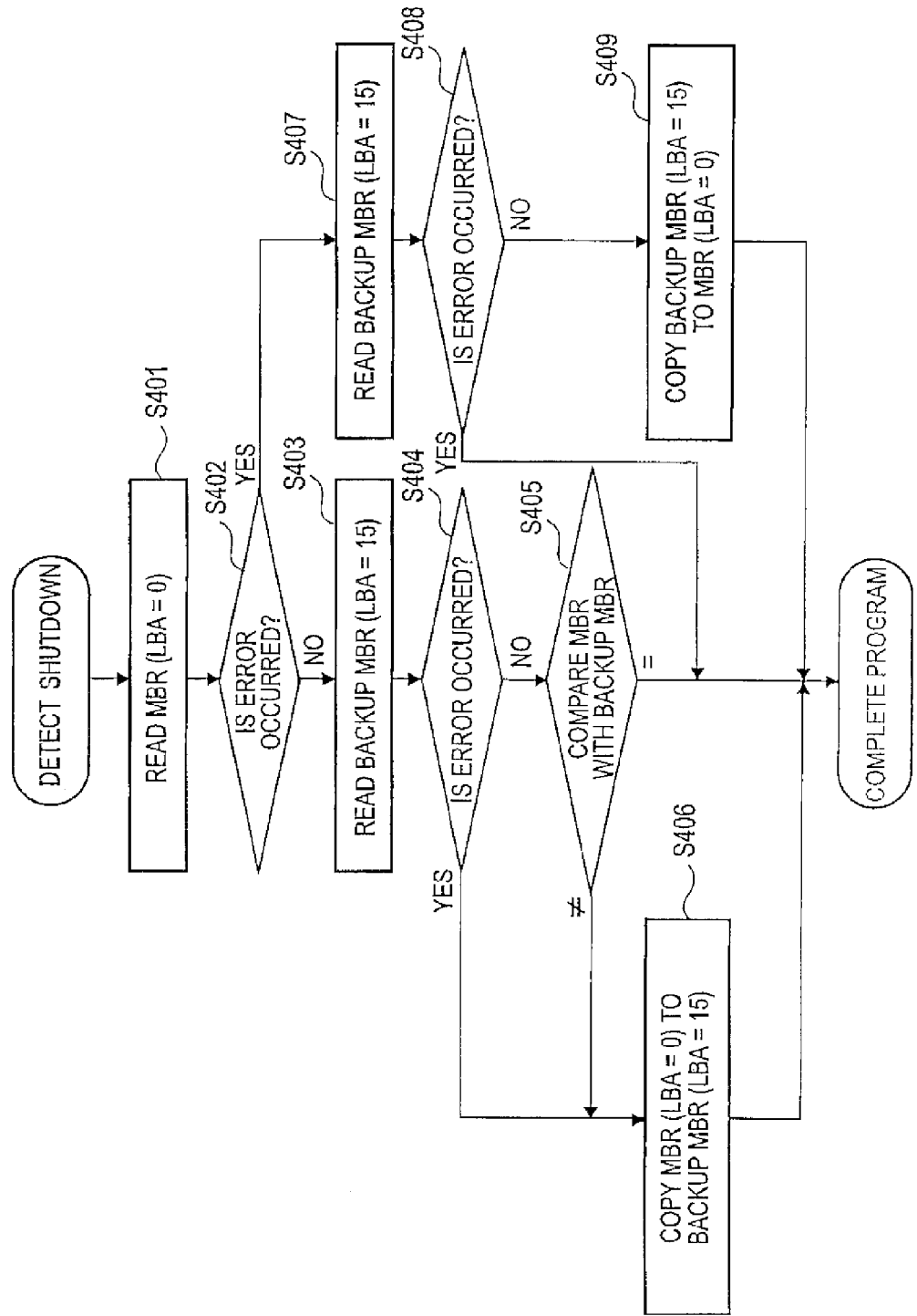
{FIG. 5} A figure illustrates a flowchart of the completion of a disk monitor service during the shutdown when Windows (registered trademark) is used as the OS.

FIG. 5 illustrates a flowchart of the completion of the disk monitor service during the shutdown while Windows (registered trademark) is used as the OS.

The MBR may be changed when the partition table of the disk or the like has been updated from an arbitrary application after the OS start-up. Then, the MBR is different from the backup MBR. When the BIOS does not recognize the difference and automatically restores the MBR using the backup MBR, it means that the MBR is not actually restored. When the MBR is properly changed on the OS, it is necessary to update the backup MBR at the time of the completion (shutdown) of the OS.

As illustrated in FIG. 5, when detecting the shutdown, the CPU 24 reads the LBA 0 of the MBR with the OS (step S401). Sequentially, it is determined in step S402 whether a read error of the disk occurs and whether the MBR is improper. When the read error of the disk does not occur and the MBR is not improper (No in step S402), the CPU 24 reads the LBA 15 of the backup MBR (step S403). Then, it is determined in step S404 whether a read error of the disk occurs, whether the MBR is improper, and whether the MBR has not been backed up.

When it is determined that a read error of the disk does not occur, that the MBR is not improper, and that the MBR has been backed up (No in step S404), the MBR is compared to the backup MBR in step S405. When the MBR is identical to the backup MBR, the program is completed.

On the other hand, when it is determined that a read error of the disk occurs, that the MBR is improper, or that the MBR has not been backed up (Yes in step S404), the LBA 0 of the MBR is copied to the LBA 15 of the backup MBR (step S406) and then the program is completed.

Similarly, when the MBR is not identical to the backup MBR after the MBR is compared to the backup MBR in step S405, the LBA 0 of the MBR is copied to the LBA 15 of the backup MBR (step S406) and then the program is completed.

When a read error of the disk occurs, or the MBR is improper in step S402 (Yes in step S402), the LBA 15 of the backup MBR is read (step S407). Sequentially, it is determined in step 5408 whether a read error of the disk does not occurs and whether the MBR is improper, and whether the MBR has been backed up. When it is determined that a read error of the disk does not occur, that the MBR is not improper, and that the MBR has been backed up (No in step S408), the LBA 15 of the backup MBR is copied to the LBA 0 of the MBR (step S409) and then the program is completed.

EXAMPLES

Figure 6:
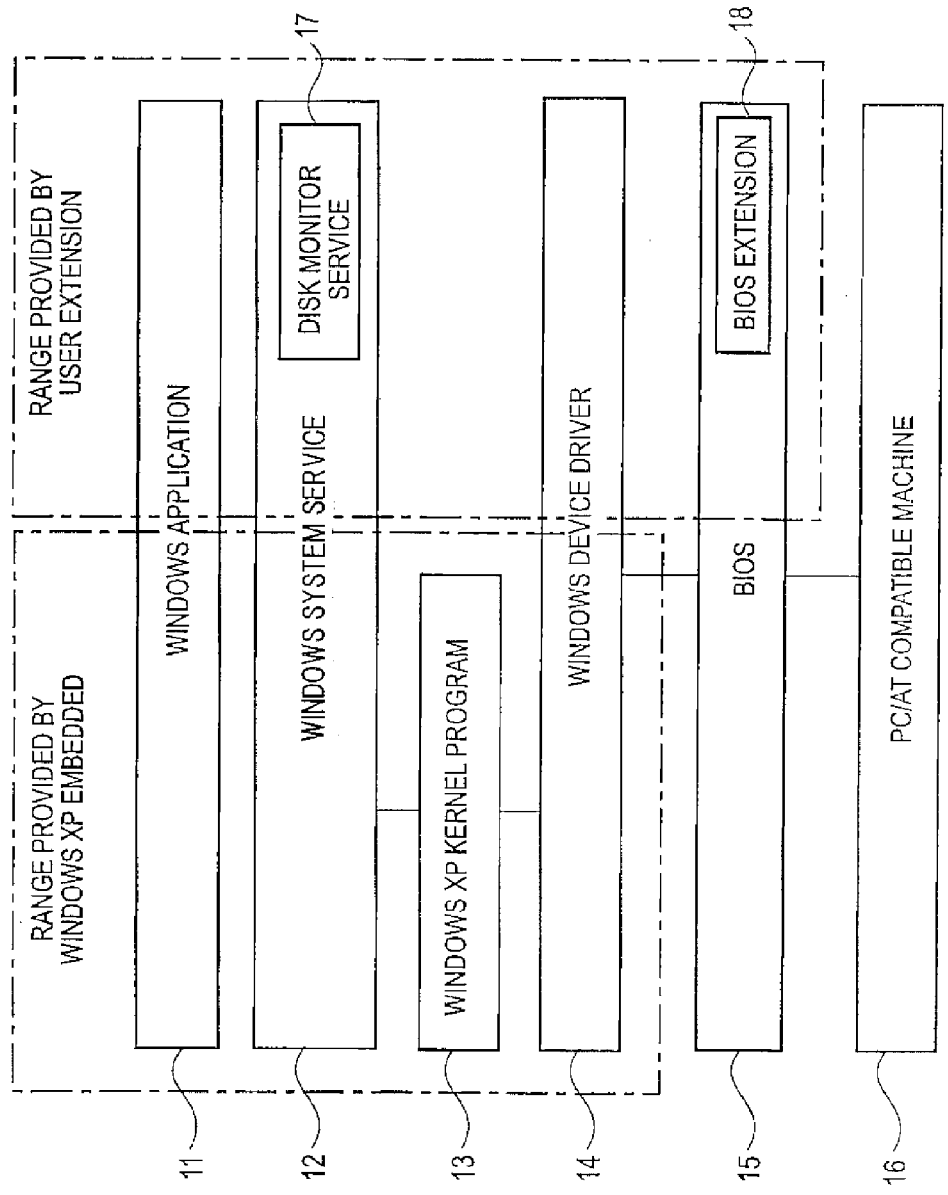
{FIG. 6} A figure illustrates a block diagram of the positions of implementation of a BIOS program illustrated in FIG. 4 and a service program illustrated in FIG. 5 when Microsoft Windows XP Embedded is selected as the OS in an example of the present invention.

FIG. 6 illustrates a block diagram of the positions of implementation of the BIOS program illustrated in FIG. 4 and the service program illustrated in FIG. 5 when Microsoft Windows XP Embedded is selected as the OS in an example of the present invention. A PC/AT compatible machine 16 is equipped with a Windows application 11, a Windows system service 12, a Windows XP kernel program 13, a Windows device driver 14, and a BIOS 15.

A disk monitor service 17 that detects a shutdown and updates the backup MBR is provided as a program (software) implemented as the Windows system service 12.

The portion illustrated as a BIOS extension 18 is provided as a function incorporated into the BIOS 15.

Figure 7:
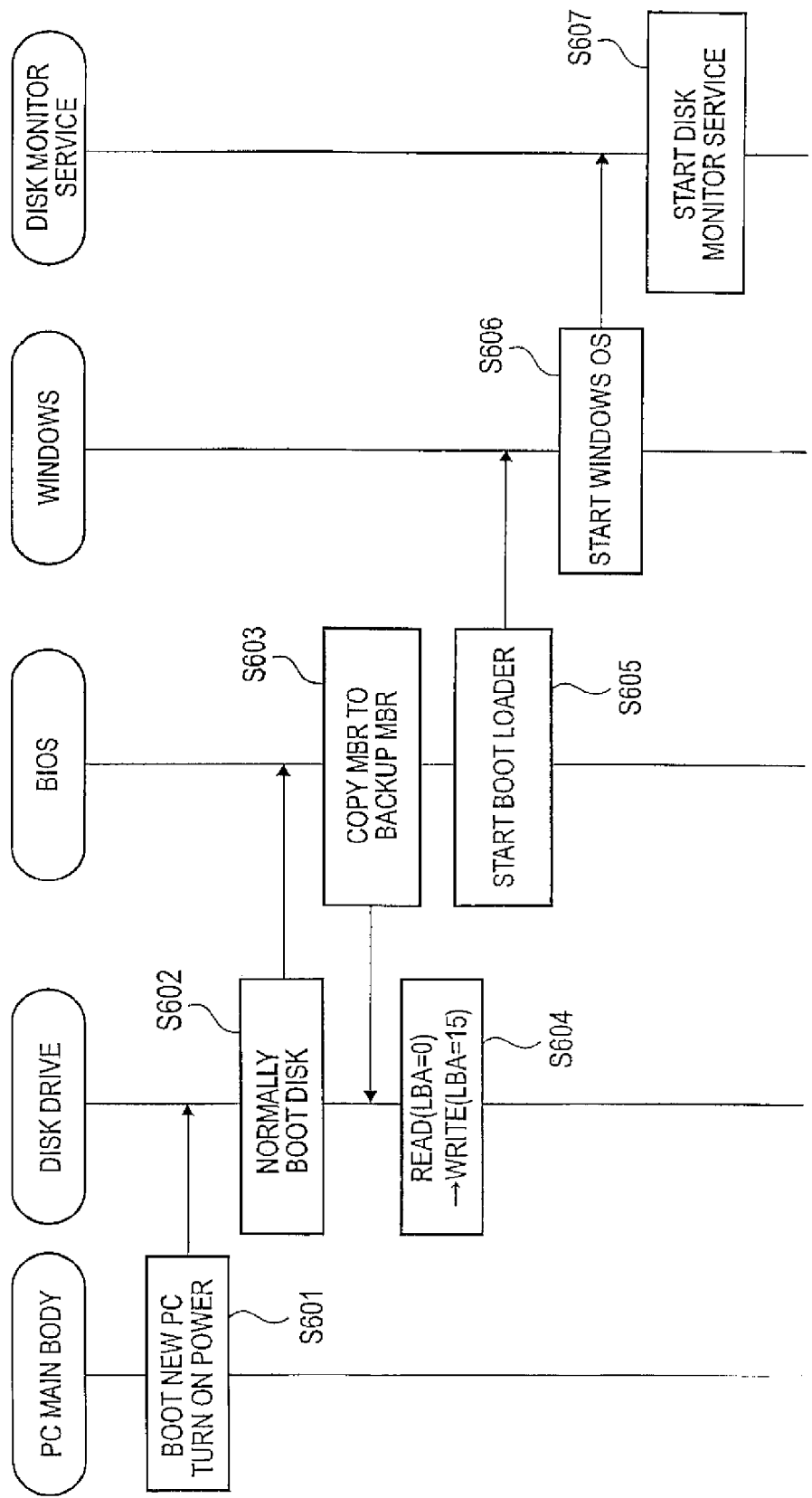
{FIG. 7} A figure illustrates a sequence in which the MBR is copied to a backup MBR when a new PC boots for the first time.

FIG. 7 illustrates a sequence in which the MBR is copied to a backup MBR when a new PC boots for the first time.

As illustrated in FIG. 7, when the power of a new computer (PC) is turned on for the first time (step S601) and the disk drive normally boots (step S602), a CPU starts the BIOS and gives the BIOS an instruction to copy the MBR to a backup MBR (step S603). Sequentially, the LBA 0 of the MBR is read in the disk drive and written to the LBA 15 of the backup MBR (step S604). As a result, the sector data of the LBA 0 of the MBR is copied to the LBA 15 of the backup MBR. The process performed in such a manner corresponds to step S305 in FIG. 4. After performing step S603, the BIOS starts a boot loader (step S605). Subsequently, the Windows OS starts (step S606). Then, the disk monitor service starts (step S607).

Figure 8:
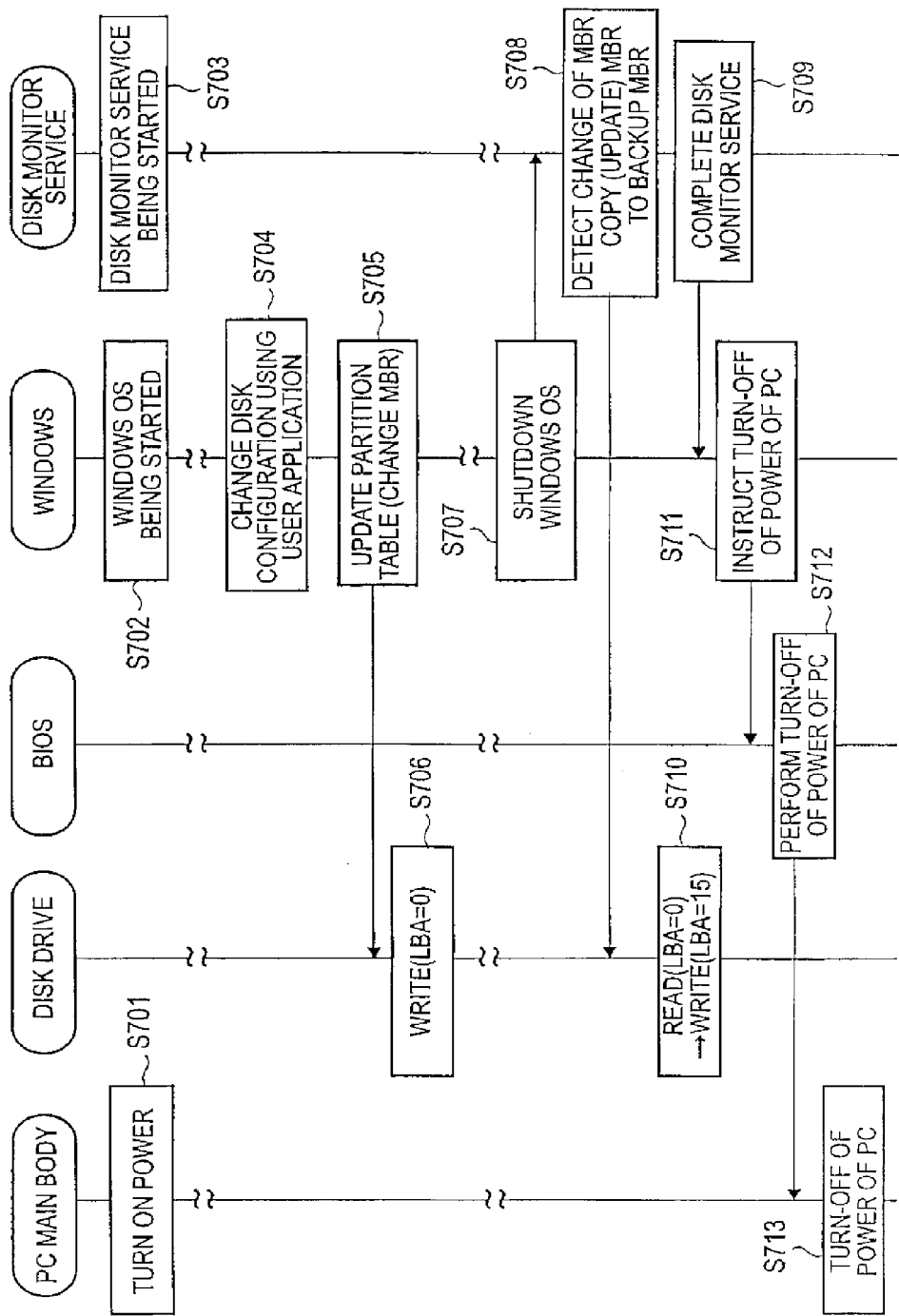
{FIG. 8} A figure illustrates a sequence in which the MBR is changed by a user application or the like during the start of the Windows (OS).

FIG. 8 illustrates a sequence in which the MBR is changed by a user application or the like during the start-up of the Windows (OS).

As illustrated in FIG. 8, when the disk configuration is changed (for example, a partition is added to a free space) in step S704 during the start-up of the Windows OS and the start-up of the disk monitor service after the power of the PC main body is turned (steps S701 to S703), the partition table is updated in step 705. The writing process to the MBR is actually performed (the update is written to the LBA 0 of the MBR) in step S706.

In that case, when detecting a shutdown of the Windows (OS) (step S707) and the change of the MBR, the disk monitor service gives the disk drive an instruction to copy the MBR to the backup MBR (step S708). Sequentially, the LBA 0 of the MBR is read in the disk drive and written to the LBA 15 of the backup MBR (step S710) so as to be copied to the backup MBR. The performed process corresponds to step S406 in FIG. 5.

When the disk monitor service is completed (step S709) after the process in step S708, the Windows OS gives the BIOS an instruction to turn off the power of the PC (step S711). The BIOS turns off the power of the PC (step S712). The power of the PC is turned off (step S713).

Figure 9:
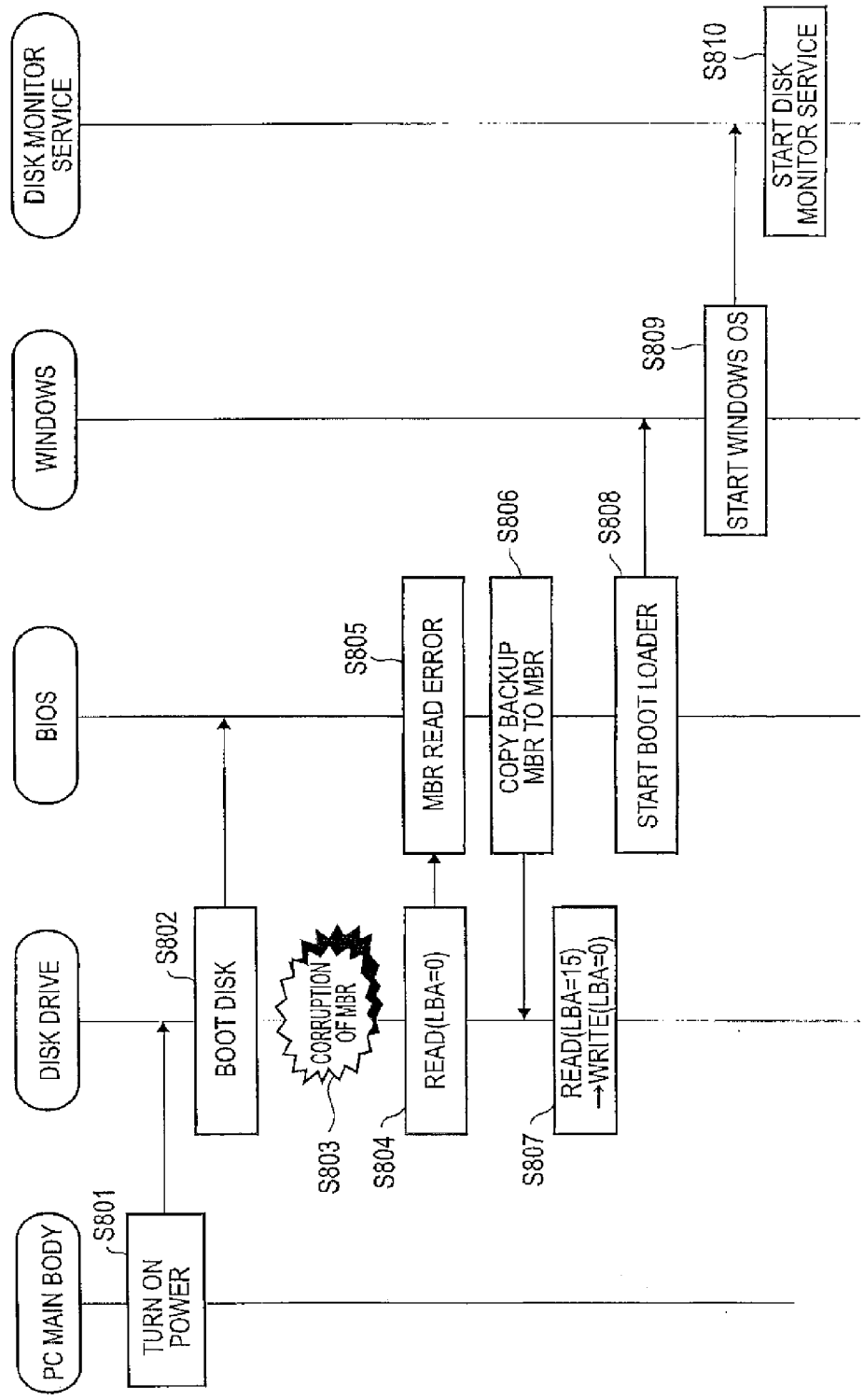

FIG. 9 illustrates a sequence in which the sector data of the LBA 15 of the backup MBR is started as the MBR when the MBR is corrupted while the power of the PC is turned on.

As illustrated in FIG. 9, when the power of the PC main body is turned on (step S801), the disk drive boots the disk (step S802). It is assumed that the MBR is corrupted when the power is turned on as illustrated in step S803. In this case, it is assumed that the LBA 0 of the MBR cannot be read normally (step S804). The BIOS detects a read error of the disk (step S805).

The BIOS gives the disk drive an instruction to copy the backup MBR to the MBR in step 806. The LBA 15 of the backup MBR is read and written back to the LBA 0 of the MBR in step 807 (step 807). While the LBA 15 of the backup MBR is read and written back to the LBA 0 of the MBR, the boot loader of the OS is started at the same time as the MBR to start the Windows OS so as to start the disk monitor service (steps S808 to S810).

It is actually confirmed that rewriting the MBR restores the OS when the corruption of the MBR in the hard disk causes the OS start-up failure. According to the present embodiment, a temporal restoration of the MBR enables the PC to boot so that the file data recorded in a high-capacity disk can be preserved when the MBR has been corrupted just before the end of life of the high-capacity disk. In such a case, the OS obtains the restoration history from the BIOS and notifies the history to the user so that the user can take a proper measure, for example, disk replacement before a failure, for example, in that the hard disk totally stops operating.

The failure caused by the corruption of the MBR similarly occurs in a silicon disk (Solid State Disk (SDD) that records the data in a flash memory) other than the hard disk. In such a case, restoring only the MBR boots the PC normally so that all the data files can be read.

Thus, the configuration of the present embodiment is effectively applied for all disk drives as an external storage used in a general PC.

A method in which the backup MBR is backed up in the LBA=15 has been described in the above described example. However, the LBA=1 to the LBA=15 are usually reserved (unused) in a general PC/AT compatible machine so that an example in which a plurality of files is backed up in the 15 sectors to increase reliability, or an example in which the 15 sectors are used for multi-generation backups can be implemented.

As the process at the time of the OS shutdown illustrated in FIG. 5, there can be a method in which the MBR is backed up as a file in the file system other than the LBA=1 to the LBA=15.

In the present embodiment and the present example, the disk BIOS cooperates with the OS in the PC to automatically back up the MBR recognized at the boot to a reserved sector. The backed up sector data and the MBR are verified to automatically restore the MBR at the OS shutdown. The backed up sector data and the MBR are verified using the BIOS program at the PC boot. When the MBR has been corrupted, the MBR is automatically restored from the back up sector to perform the boot process.

Windows has been cited as an exemplary OS in the embodiment and the example. However, another OS, for example, LINUX may also be used.

In addition to a computer and a method for controlling a computer, the present invention also relates to a program and a computer readable information storage medium that stores the program. The present invention can be implemented with a computer program or by reading a program from the computer readable storage medium and executing the program with the computer. The program is stored in computer readable information storage media including a flexible disk, for example, a floppy disk, a CD-ROM, a DVD, and a flash memory, or is provided through a network, for example, the Internet. Then, such a program operates after being read and executed by the computer. The program is sometimes stored in an information storage medium, for example, a hard disk device or a ROM in advance to be implemented in the computer.

Although the above-mentioned embodiment and example are preferred embodiment and example of the present invention, the scope of the invention is not limited to only the above-mentioned embodiment and example. The present invention can be implemented in various changed embodiments without departing from the scope of the present invention. Thus, the above-mentioned embodiment and example are merely examples and should not restrictively be interpreted. The scope of the present invention is defined by the scope of the claims and is not limited to the specification or the abstract. All the variation or modification that come within the meaning and range of equivalency of the claims are intended to be embraced in the scope of the present invention.

This application claims the priority based on Japanese Patent Application No. 2011-114695, filed May 23, 2011 (Japanese Patent No. 5077726, Patent date: Sep. 7, 2012), which is hereby incorporated herein in its entirety.

Although a part or whole of the embodiment can be described as the following supplementary notes, it is not limited to the configurations to be described below. 2011-114695, filed May 23, 2011, which is hereby incorporated herein in its entirety. Although a part or whole of the embodiment can be described as the following supplementary notes, it is not limited to the configurations to be described below.

(Supplementary Note 1)

A method for controlling a computer comprising a CPU, and a storage unit, the storage unit storing a master boot record (MBR), a backup MBR to which the MBR is copied, and an OS,
the method comprising:
reading, by the CPU, the MBR and the backup MBR from the storage unit using the OS when detecting a shutdown; and
performing, by the CPU, any one of following processes (1), (2), and (3):
(1) copying the MBR to the backup MBR when the MBR and the backup MBR are capable of normally being read and data of the MBR is not identical to data of the backup MBR;
(2) copying the MBR to the backup MBR when the MBR is capable of normally being read and the backup MBR is not capable of normally being read or is improper; and
(3) copying the backup MBR to the MBR when the backup MBR is capable of normally being read and the MBR is not capable of normally being read or is improper.

(Supplementary Note 2)

A method for controlling a computer comprising a CPU, a storage unit, and a memory storing a BIOS, the storage unit storing a master boot record (MBR), and a backup MBR to which the MBR is copied,
the method comprising:
reading, by the CPU, the MBR and the backup MBR from the storage unit with operating the BIOS when a power of the computer is turned on; and
performing, by the CPU, any one of following processes (1), and (2):
(1) copying the backup MBR to the MBR when the MBR and the backup MBR are capable of normally being read and data of the MBR is not identical to data of the backup MBR; and
(2) copying the MBR to the backup MBR when the MBR is capable of normally being read and the backup MBR is not capable of normally being read or is improper.

(Supplementary Note 3)

A computer comprising:
a storage unit storing a master boot record (MBR), a backup MBR to which the MBR is copied, and an OS; and
a CPU reading the MBR and the backup MBR from the storage unit using the OS when detecting a shutdown, and performing any one of following processes (1), (2), and (3):
(1) copying the MBR to the backup MBR when the MBR and the backup MBR are capable of normally being read and data of the MBR is not identical to data of the backup MBR;
(2) copying the MBR to the backup MBR when the MBR is capable of normally being read and the backup MBR is not capable of normally being read or is improper; and
(3) copying the backup MBR to the MBR when the backup MBR is capable of normally being read and the MBR is not capable of normally being read or is improper.

(Supplementary Note 4)

A computer comprising:
a storage unit storing a master boot record (MBR), and a backup MBR to which the MBR is copied;
a memory storing a BIOS; and
a CPU reading the MBR and the backup MBR from the storage unit with operating the BIOS when a power of the computer is turned on, and performing any one of following processes (1), and (2):
(1) copying the MBR to the backup MBR when the MBR and the backup MBR are capable of normally being read and data of the MBR is not identical to data of the backup MBR; and
(2) copying the MBR to the backup MBR when the MBR is capable of normally being read and the backup MBR is not capable of normally being read or is improper.

(Supplementary Note 5)

A computer readable information storage medium that stores a program causing a computer including a storage unit storing a master boot record (MBR), a backup MBR to which the MBR is copied, and an OS to read the MBR and the backup MBR when a shutdown is detected and to perform any one of following processes (1), (2), and (3):
(1) copying the MBR to the backup MBR when the MBR and the backup MBR are capable of normally being read and data of the MBR is not identical to data of the backup MBR;
(2) copying the MBR to the backup MBR when the MBR is capable of normally being read and the backup MBR is not capable of normally being read or is improper; and
(3) copying the backup MBR to the MBR when the backup MBR is capable of normally being read and the MBR is not capable of normally being read or is improper.

(Supplementary Note 6)

A computer readable information storage medium that stores a program causing a computer including a storage unit storing a master boot record (MBR), and a backup MBR to which the MBR is copied, and a memory storing a BIOS to read the MBR and the backup MBR when a power is turned on and to perform any one of following processes (1), and (2):
(1) copying the MBR to the backup MBR when the MBR and the backup MBR are capable of normally being read and data of the MBR is not identical to data of the backup MBR; and
(2) copying the MBR to the backup MBR when the MBR is capable of normally being read and the backup MBR is not capable of normally being read or is improper.

{Industrial Applicability}

The present invention relates to a computer and a method for controlling a computer and, in particular, is applied to a system using a PC/AT compatible machine without regard for individual use or professional use.

{Reference Signs List}

11 Windows application
12 Windows system service
13 Windows XP kernel program
14 Windows device driver
15 BIOS
16 PC/AT compatible machine
17 Disk monitor service
18 BIOS extension.

What is claimed is:

1. A method for controlling a computer comprising a storage unit storing a master boot record (MBR), a backup MBR to which the MBR is copied, an operating system (OS), and a memory storing a BIOS, the method comprising:
reading, by the OS, the MBR and the backup MBR from the storage unit when detecting a shutdown, and determining, by the OS, whether the MBR and the backup MBR are capable of normally being read or are improper and whether data of the MBR is identical to data of the backup MBR;
performing either one of first copying of the MBR to the backup MBR and second copying of the backup MBR to the MBR without a user's operation, the first copying being performed if the MBR and the backup MBR are capable of normally being read and data of the MBR is not identical to data of the backup MBR or the MBR is capable of normally being read and the backup MBR is not capable of normally being read or is improper, and the second copying being performed if the backup MBR is capable of normally being read and the MBR is not capable of normally being read or is improper;
reading, by the BIOS, the MBR and the backup MBR from the storage unit when a power of the computer is turned on;
determining whether the MBR and the backup MBR are capable of normally being read or are improper and whether data of the MBR is identical to data of the backup MBR;
if the MBR is capable of normally being read and the backup MBR is not capable of normally being read or is improper, then performing first copying of the MBR to the backup MBR;
if the MBR and the backup MBR are capable of normally being read and data of the MBR is not identical to data of the backup MBR, then performing second copying in of the backup to the MBR; and
if the backup MBR is capable of normally being read and the MBR is not capable of normally being read or is improper; wherein
when the first copying is performed, if a writing error occurs, then the load of the MBR is completed without creation of the backup MBR and if the writing error does not occur, then the load of the MBR is completed after creation of the backup MBR, the creation of the backup MBR including initial creation of the backup MBR, and
when the second copying is performed, if a writing error occurs, then neither of the MBR and the backup MBR is loaded, and if the writing error does not occur, then the backup MBR is loaded as the MBR.

2. A method according to claim 1,
wherein the MBR and the backup MBR are stored in the same disk drive included in the storage unit.

3. A method for controlling a computer comprising a storage unit and a memory storing a basic input output system (BIOS), the storage unit storing a master boot record (MBR), and a backup MBR to which the MBR is copied, the method comprising:
reading, by the BIOS, the MBR and the backup MBR from the storage unit when a power of the computer is turned on, and determining, by the BIOS, whether the MBR and the backup MBR are capable of normally being read or are improper and whether data of the MBR is identical to data of the backup MBR;
if the MBR is capable of normally being read and the backup MBR is not capable of normally being read or is improper, then performing first copying of the MBR to the backup MBR;
if the MBR and the backup MBR are capable of normally being read and data of the MBR is not identical to data of the backup MBR, then performing second copying of the backup MBR to the MBR; and
if the backup MBR is capable of normally being read and the MBR is not capable of normally being read or is improper, then performing the second copying of the backup MBR to the MBR; wherein
when the first copying is performed, if a writing error occurs, then the load of the MBR is completed without creation of the backup MBR, and if the writing error does not occur, then the load of the MBR is completed after creation of the backup MBR, the creation of the backup MBR including initial creation of the backup MBR, and
when the second copying is performed, if a writing error occurs, then neither of the MBR and the backup MBR is loaded, and if the writing error does not occur, then the backup MBR is loaded as the MBR.

4. A method according to claim 3,
wherein the MBR and the backup MBR are stored in the same disk drive included in the storage unit.

5. A computer comprising a storage unit storing a master boot record (MBR), a backup MBR to which the MBR is copied, an operating system (OS), and a memory storing a basic input output system BIOS the OS performing:
reading the MBR and the backup MBR from the storage unit when detecting a shutdown;
determining whether the MBR and the backup MBR are capable of normally being read or are improper and whether data of the MBR is identical to data of the backup MBR; and
performing either one of first copying of the MBR to the backup MBR and second copying of the backup MBR to the MBR without a user's operation, the first copying being performed if the MBR and the backup MBR are capable of normally being read and data of the MBR is not identical to data of the backup MBR or the MBR is capable of normally being read and the backup MBR is not capable of normally being read or is improper, and the second copying being performed if the backup MBR is capable of normally being read and the MBR is not capable of normally being read or is improper; and the BIOS performing:
reading the MBR and the backup MBR from the storage unit when a power of the computer is turned on:
determining whether the MBR and the backup MBR are capable of normally being read or are improper and whether data of the MBR is identical to data of the backup MBR;
if the MBR is capable of normally being read and the backup MBR is not capable of normally being read or is improper, then performing first copying of the MBR to the backup MBR
if the MBR and the backup MBR are capable of normally being read and data of the MBR is not identical to data of the backup MBR, then performing second copying of the backup to the MBR; and
if the backup MBR is capable of normally being read and the MBR is not capable of normally being read or is improper, then performing the second copying of the backup MBR to the MBR; wherein when the first copying is performed, if a writing error occurs, then the load of the MBR is completed without creation of the backup MBR and if the writing error does not occur, then the load of the MBR is completed after creation of the backup MBR, the creation of the backup MBR including initial creation of the backup MBR, and when the second copying is performed, if a writing error occurs, then neither of the MBR and the backup MBR is loaded, and if the writing error does not occur, then the backup MBR is loaded as the MBR.

6. A computer according to claim 5,
wherein the MBR and the backup MBR are stored in the same disk drive included in the storage unit.

7. A computer comprising:
a storage unit storing a master boot record (MBR), and a backup MBR to which the MBR is copied; and
a memory storing a basic input output system (BIOS), the BIOS performing:
reading the MBR and the backup MBR from the storage unit when a power of the computer is turned on;
determining whether the MBR and the backup MBR are capable of normally being read or are improper and whether data of the MBR is identical to data of the backup MBR;
if the MBR is capable of normally being read and the backup MBR is not capable of normally being read or is improper, then performing first copying of the MBR to the backup MBR;
if the MBR and the backup MBR are capable of normally being read and data of the MBR is not identical to data of the backup MBR, then performing second copying of the backup MBR to the MBR; and,
if the backup MBR is capable of normally being read and the MBR is not capable of normally being read or is improper, then performing the second copying of the backup MBR to the MBR; wherein
when the first copying is performed, if a writing error occurs, then the load of the MBR is completed without creation of the backup MBR, and if the writing error does not occur, then the load of the MBR is completed after creation of the backup MBR, the creation of the backup MBR including initial creation of the backup MBR, and
when the second copying is performed, if a writing error occurs, then neither of the MBR and the backup MBR is loaded, and if the writing error does not occur, then the backup MBR is loaded as the MBR.

8. A computer according to claim 7,
wherein the MBR and the backup MBR are stored in the same disk drive included in the storage unit.

9. A non-transitory computer readable information storage medium that stores a program causing a computer including a storage unit storing a master boot record (MBR), a backup MBR to which the MBR is copied, an operating system (OS) and a memory storing a basic input output system (BIOS) to perform:
reading the MBR and the backup MBR when a shutdown is detected;
determining whether the MBR and the backup MBR are capable of normally being read or are improper and whether data of the MBR is identical to data of the backup MBR;
performing either one of first copying of the MBR to the backup MBR and second copying of the backup MBR to the MBR without a user's operation, the first copying being performed if the MBR and the backup MBR are capable of normally being read and data of the MBR is not identical to data of the backup MBR or the MBR is capable of normally being read and the backup MBR is not capable of normally being read or is improper, and the second copying being performed if the backup MBR is capable of normally being read and the MBR is not capable of normally being read or is improper;
reading the MBR and the backup MBR when a power is turned on;
determining whether the MBR and the backup MBR are capable of normally being read or are improper and whether data of the MBR is identical to data of the backup MBR; and
if the MBR is capable of normally being read and the backup MBR is not capable of normally being read or is improper, then performing first copying of the MBR to the backup MBR;
if the MBR and the backup MBR are capable of normally being read and data of the MBR is not identical to data of the backup MBR, then performing second copying of the backup to the MBR; and
if the backup MBR is capable of normally being read and the MBR is not capable of normally being read or is improper, then performing the second copying of the backup MBR to the MBR; wherein
when the first copying is performed, if a writing error occurs, then the load of the MBR is completed without creation of the backup MBR and if the writing error does not occur, then the load of the MBR is completed after creation of the backup MBR, the creation of the backup MBR including initial creation of the backup MBR, and
when the second copying is performed, if a writing error occurs, then neither of the MBR and the backup MBR is loaded, and if the writing error does not occur, then the backup MBR is loaded as the MBR.

10. A non-transitory computer readable information storage medium according to claim 9,
wherein the MBR and the backup MBR are stored in the same disk drive included in the storage unit.

11. A non-transitory computer readable information storage medium that stores a program causing a computer including a storage unit storing a master boot record (MBR), and a backup MBR to which the MBR is copied, and a memory storing a basic input output system (BIOS) to perform:
reading the MBR and the backup MBR when a power is turned on;
determining whether the MBR and the backup MBR are capable of normally being read or are improper and whether data of the MBR is identical to data of the backup MBR;
if the MBR is capable of normally being read and the backup MBR is not capable of normally being read or is improper, then performing first copying of the MBR to the backup MBR—
if the MBR and the backup MBR are capable of normally being read and data of the MBR is not identical to data of the backup MBR, then performing second copying of the backup MBR to the MBR; and
if the backup MBR is capable of normally being read and the MBR is not capable of normally being read or is improper, then performing the second copying of the backup MBR to the MBR; wherein
when the first copying is performed, if a writing error occurs, then the load of the MBR is completed without creation of the backup MBR, and if the writing error does not occur, then the load of the MBR is completed after creation of the backup MBR, the creation of the backup MBR including initial creation of the backup MBR, and when the second copying is performed, if a writing error occurs, then neither of the MBR and the backup MBR is loaded, and if the writing error does not occur, then the backup MBR is loaded as the MBR.

12. A non-transitory computer readable information storage medium according to claim 11, wherein the MBR and the backup MBR are stored in the same disk drive included in the storage unit.

* * * * *